UNITED STATES PATENT OFFICE.

STEPHEN R. ANDRES, OF PHILADELPHIA, PENNSYLVANIA.

IMPROVEMENT IN ARTICLES OF FOOD FROM BEANS.

Specification forming part of Letters Patent No. 202,975, dated April 30, 1878; application filed February 9, 1877.

*To all whom it may concern:*

Be it known that I, STEPHEN R. ANDRES, of the city and county of Philadelphia, and State of Pennsylvania, have invented a new and useful Improvement in Articles of Food from Beans, which improvement is fully set forth in the following specification:

The object of my invention is to produce from beans an article of food exceedingly palatable, nutritious, wholesome, compact, reduced in weight and bulk, convenient of transportation, ready for dishes of various kinds, and not affected by climate and time.

For this purpose the beans are hulled, as a preliminary step, whereby they are deprived of qualities that are deleterious and cause flatulency, and they are afterward subjected to cooking, crushing, and drying, whereby the product is fit for the market and use.

The beans are selected or picked so as to separate foreign substances, after which they will be hulled, which may be accomplished in a dry state or after being sufficiently soaked.

The hulled beans are now cooked by steam or otherwise, and then crushed, the mass assuming the form of pellets, strips, particles, flour, or other form, which mass will be dried either by being subjected to a hot-air blast or other heating medium, the former being preferred, as the hot air quickly permeates the mass and deprives it of all humidity. The article is now fit for the market and use.

It will be seen that I produce a superior article of food, the same being palatable, nutritious, and in convenient form for transportation and use, and one that will preserve its valuable qualities regardless of time or climate.

Moreover, the bean is divested of qualities that are deleterious and cause flatulency, whereby the product is exceedingly wholesome, and it is adapted for food for children and invalids, as well as for robust persons and others exposed to severe weather and hardships.

I am aware that it is not new to prepare bean-flour from beans with which the hulls are cooked; but in such process the flatulent and deleterious qualities of the hulls, together with a large portion of the hulls themselves, remain in the product, which defect is corrected by my invention.

Having thus described my invention, what I claim as new, and desire to secure by Letters Patent, is—

The described article of food made from beans deprived of their deleterious properties by the removal of the hulls prior to cooking, crushing, and drying, substantially as specified.

STEPHEN R. ANDRES.

Witnesses:
  JOHN A. WIEDERSHEIM,
  A. P. GRANT.